United States Patent
Purushothaman et al.

(10) Patent No.: US 11,138,168 B2
(45) Date of Patent: Oct. 5, 2021

(54) DATA ANALYSIS AND SUPPORT ENGINE

(71) Applicant: Bank of America Corporation, Charlotte, NC (US)

(72) Inventors: Sasidhar Purushothaman, Hyderabad (IN); Amit Mishra, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 640 days.

(21) Appl. No.: 15/476,264

(22) Filed: Mar. 31, 2017

(65) Prior Publication Data

US 2018/0285750 A1    Oct. 4, 2018

(51) Int. Cl.
| | |
|---|---|
| *G06N 20/00* | (2019.01) |
| *G06F 16/22* | (2019.01) |
| *H04L 12/26* | (2006.01) |
| *G06F 11/07* | (2006.01) |
| *G06N 5/04* | (2006.01) |

(Continued)

(52) U.S. Cl.
CPC .......... *G06F 16/22* (2019.01); *G06F 11/0709* (2013.01); *G06F 11/0754* (2013.01); *G06F 11/0793* (2013.01); *G06N 5/045* (2013.01); *G06N 20/00* (2019.01); *H04L 41/147* (2013.01); *H04L 43/04* (2013.01); *H04L 43/0817* (2013.01); *H04L 43/0823* (2013.01); *H04L 43/16* (2013.01); *G06F 11/3006* (2013.01);

(Continued)

(58) Field of Classification Search
CPC ...... G06F 16/22; H04L 43/0823; H04L 43/16
See application file for complete search history.

(56) References Cited

U.S. PATENT DOCUMENTS

| | | |
|---|---|---|
| 7,412,626 B2 | 8/2008 | Wood et al. |
| 7,543,175 B2 | 6/2009 | Wood et al. |

(Continued)

OTHER PUBLICATIONS

Singh, Rishabh, Sumit Gulwani, and Armando Solar-Lezama. "Automated feedback generation for introductory programming assignments." Proceedings of the 34th ACM SIGPLAN conference on Programming language design and implementation. 2013. (Year: 2013).*

(Continued)

*Primary Examiner* — Luis A Sitiriche
*Assistant Examiner* — Sehwan Kim
(74) *Attorney, Agent, or Firm* — Banner & Witcott, Ltd.; Michael A. Springs

(57) ABSTRACT

A machine learning computing system for predicting a probability of success of an identified computing device error condition may include at least a first data repository storing a plurality of historic data records corresponding to one or more computing device error conditions and a second data repository storing a plurality of solutions to each of the computing device error conditions stored in the first data repository. A server is configured to receive a computing device error message from at least one computing center device and analyze the computing device error message to identify an associated error condition category. The server identifies at least two solutions to an associated error condition and predict a probability of success for each of the at least two solutions. The server then initiates at least one solution that has a greatest probability of success and updates the second data repository.

20 Claims, 2 Drawing Sheets

(51) Int. Cl.
*H04L 12/24* (2006.01)
*G06F 11/30* (2006.01)
*G06F 11/34* (2006.01)

(52) U.S. Cl.
CPC ...... *G06F 11/3409* (2013.01); *G06F 2201/81* (2013.01)

(56) References Cited

U.S. PATENT DOCUMENTS

| | | | |
|---|---|---|---|
| 7,764,830 B1 | 7/2010 | Wnek | |
| 8,111,667 B2 | 2/2012 | Shida et al. | |
| 8,626,149 B2 | 1/2014 | Steenstra et al. | |
| 8,666,921 B2 | 3/2014 | Fisher, Jr. | |
| 8,793,208 B2 | 7/2014 | Rojahn | |
| 9,053,180 B2 | 6/2015 | Rojahn | |
| 9,276,860 B2 | 3/2016 | Kim et al. | |
| 2003/0233268 A1 | 12/2003 | Taqbeem et al. | |
| 2007/0288304 A1 | 12/2007 | Gutierrez et al. | |
| 2008/0141066 A1* | 6/2008 | Wood .................... | H04L 41/064 714/4.2 |
| 2011/0113429 A1 | 5/2011 | Oda | |
| 2012/0004974 A1* | 1/2012 | Burger .................. | G06Q 30/02 705/14.27 |
| 2012/0166874 A1* | 6/2012 | Bernardez ............... | H04M 1/24 714/26 |
| 2012/0310842 A1* | 12/2012 | Fisher, Jr. ............. | G06Q 10/10 705/304 |
| 2014/0067912 A1* | 3/2014 | Vutukoori ........... | G06F 11/0748 709/203 |
| 2014/0358609 A1 | 12/2014 | de Assuncao et al. | |
| 2016/0277509 A1 | 9/2016 | Qiang | |
| 2017/0076239 A1 | 3/2017 | Rahul U et al. | |
| 2017/0284691 A1* | 10/2017 | Sinha ...................... | F24F 11/62 |
| 2018/0212852 A1* | 7/2018 | Kumar .................. | H04W 12/08 |

OTHER PUBLICATIONS

4 Essential Steps for Successful Incident Management, https://ayehu.com/4-essential-steps-for-successful-incident-management, © Ayehu Software Technologies, Ltd., dated Nov. 24, 2014, 6 pages.
8 Best Practices for IT Incident Management With Dan Barthelemy, Endurance International Group, www.everbridge.com/webinars, dated Nov. 5, 2015, 30 pages.
Administrator user guide : Nimsoft Service Desk V 6.2.3, http://docs.nimsoft.com/prodhelp/en_US/NSD/6.2.3/AdministratorGuide/index.htm?toc.htm?1995687.html, dated 2012, 662 pages.
Best Practice—Incident Resolution Workflow—ServiceNow Wiki, dated Aug. 9, 2016, 5 pages.
Good Practice Guide for Incident Management, European Network and Information Security Agency, www.enisa.europa.eu, dated 2010, 110 pages.
OSF Service Support, Incident Management Process [Version 1.1], dated Jul. 20, 2011, 18 pages.
Incident Management Process Handbook Griffith University Version 1.7, dated Apr. 30, 2013, 43 pages.
ITIL—A guide to incident management, accessed Mar. 31, 3017, 7 pages.
http://www.bmc.com/guides/itil-incident-management.html, Dec. 22, 2016, 36 pages.

* cited by examiner

DATA ANALYSIS AND SUPPORT ENGINE

BACKGROUND

Business organizations, educational institutions, government entities, and other such entities may provide services to consumers via computing resources. In many cases, the computing resources may be used to provide products and/or services to different users, such as via one or more computing networks, such as the Internet, a wide area network (WAN), a telecommunications network, a local area network (LAN), a cable network, and/or the like. In some cases, these computing systems may include distributed computing centers, such as data centers, cloud computing systems, application servers including large numbers of computing resources, such as servers, data repositories, web servers, and the like that may be used to provide the products and/or services to the consumer.

In an illustrative example, a business organization may offer one or more products and/or services such as cable, phone, and Internet services to one or more computing platforms associated with the consumer, such as a personal computer, a smart phone, a laptop computer, a tablet, and/or the like. Additional examples of the products and/or services may include financial services (e.g., an online banking service, an online trading service, and the like), educational services (e.g., an online educational course, a testing service, and the like), online shopping (e.g., an online marketplace, and the like), and/or may also provide a host of other services to their customers, such as email, personalized homepages, web page hosting, and other content and/or value-added resources. In many cases, consumers of a product or service may be internal to the business organization. For example, an organization may have a centralized information technology department that may be tasked with supporting multiple business units geographically or otherwise physically remote from the information technology department. Quality of Service (QoS) is often an important determinant of customer satisfaction with a provider of online products and/or services. Consumers today have come to expect high-quality service virtually all the time. If expected QoS is not met, customers expect the problem to be fixed promptly. Unfortunately, for a number of reasons business may often be unable to adequately address customers' complaints when they have arisen for many reasons, such as complexity of their computing networks, locations of distributed hardware and/or software, lack of direct control of the computing equipment (e.g., leased computing resources and/or data centers, and the like).

Service related issues and/or technical issues, as they occur, reduce the perceived quality of the organization's service and/or product. However, the cause of the consumer's problem may not be the organization's equipment and/or service, but may rather be due to the consumer's computer, software, or other equipment, and/or the configuration of such equipment. In some cases, a reduction in QoS include, but not be limited to, a slow connection speed, an inability to access a particular service (e.g., email, a consumer account, a product order system, a desired service, and the like), an overloaded server, a reduction of processing power, an increase in computing traffic, an outright failure to connect to the organization's website or other network service (e.g., a mobile application interface, and the like).

Due to the complexity of computing systems and interaction of computing hardware and/or software sourced from different vendors, technical problems will occur from time to time. When expected QoS is not met, consumers often contact the organization to fix the problem (even if the cause of the failure is not the due to the business organization). The business organizations that are able to promptly and professionally fix the customer's problems will tend to keep their customers happier. Additionally, when problems are resolved in a timely manner, costs may be minimized by reducing manpower costs and/or equipment costs such as by limiting an amount of time required by a service technician to diagnose and resolve the problem and/or by reducing an amount of software and/or hardware upgrades that may or may not resolve the problem. As a result, organizations that can promptly and professionally address customers' QoS complaints stand to succeed, whereas organizations that cannot fix these problems in a quick, efficient, low-cost, professional, and thorough manner will tend to lose out to their competition.

In many cases, organizations may provide resources (e.g., a call center, a chat line, a text interface, a frequently asked question webpage, and the like) that customers can utilize when problems arise. Through these resources, customers can typically notify the organizations of the problem and attempt to get the problem fixed. For example, a telephone number (e.g., a 1-800 number) may be provided with which the customer can contact a technical help desk and talk to a technical support person who can walk the person through a series of steps to attempt to fix the problem. In addition, the organization may provide a self-help Web site with technical support information. The customer may be able to type in a problem report (also referred to as an "incident" report) to be sent over the network to a technician who will reply with a suggested fix. In some cases, an organization may provide an online messaging interface (e.g., text message, a chat, a discussion board, and the like) to allow one or more users or support personal to discuss a reported problem and/or a solution to the reported problem.

Unfortunately, these conventional methods may have significant limitations. Business organizations typically have limited technical support personal available to fix reported problems. As such, technical support personnel may not be available to timely address a reported issue. Often, business organizations cannot afford to hire large numbers support personnel to address every service problem, particularly when supporting large distributed networks. Such approaches are often cost prohibitive. With regard to Web-based support, conventional self-help Web sites often leave customers confused and bewildered, due to system complexity and/or due to a lack of knowledge in a required computer, software and network technology. Furthermore, customers and support technicians (e.g., telephone-based, chat-based, email-based) often have inadequate or inappropriate tools to address particular problem.

All of the above situations may result in unnecessary costs, wasted time, and all too often a very dissatisfied internal or external customer of the organizations products and/or services. When overall customer satisfaction drops, the business organization may lose opportunities to retain current customers and/or to attract new consumers. In addition, when customer satisfaction falls, the business organization typically has significant resistance among its existing customer base to adopt new, advanced services other services that might otherwise generate new revenue. As such, a need has been recognized for computing systems that can generate a knowledge base of problems and/or solutions, analyze the knowledge base to classify a reported problem and to predict one or more likely resolutions to the problem, and to utilize machine learning to adaptively improve the knowledge base and the prediction of proper resolutions.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for providing machine learning computing system for predicting a probability of success of an identified computing device error condition may include at least a first data repository storing a plurality of historic data records corresponding to one or more computing device error conditions and a second data repository storing a plurality of solutions to each of the computing device error conditions stored in the first data repository. A server is configured to receive a computing device error message from at least one computing center device and analyze the computing device error message to identify an associated error condition category. The server identifies at least two solutions to an associated error condition and predict a probability of success for each of the at least two solutions. The server then initiates at least one solution that has a greatest probability of success and updates the second data repository.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

Figure 1:
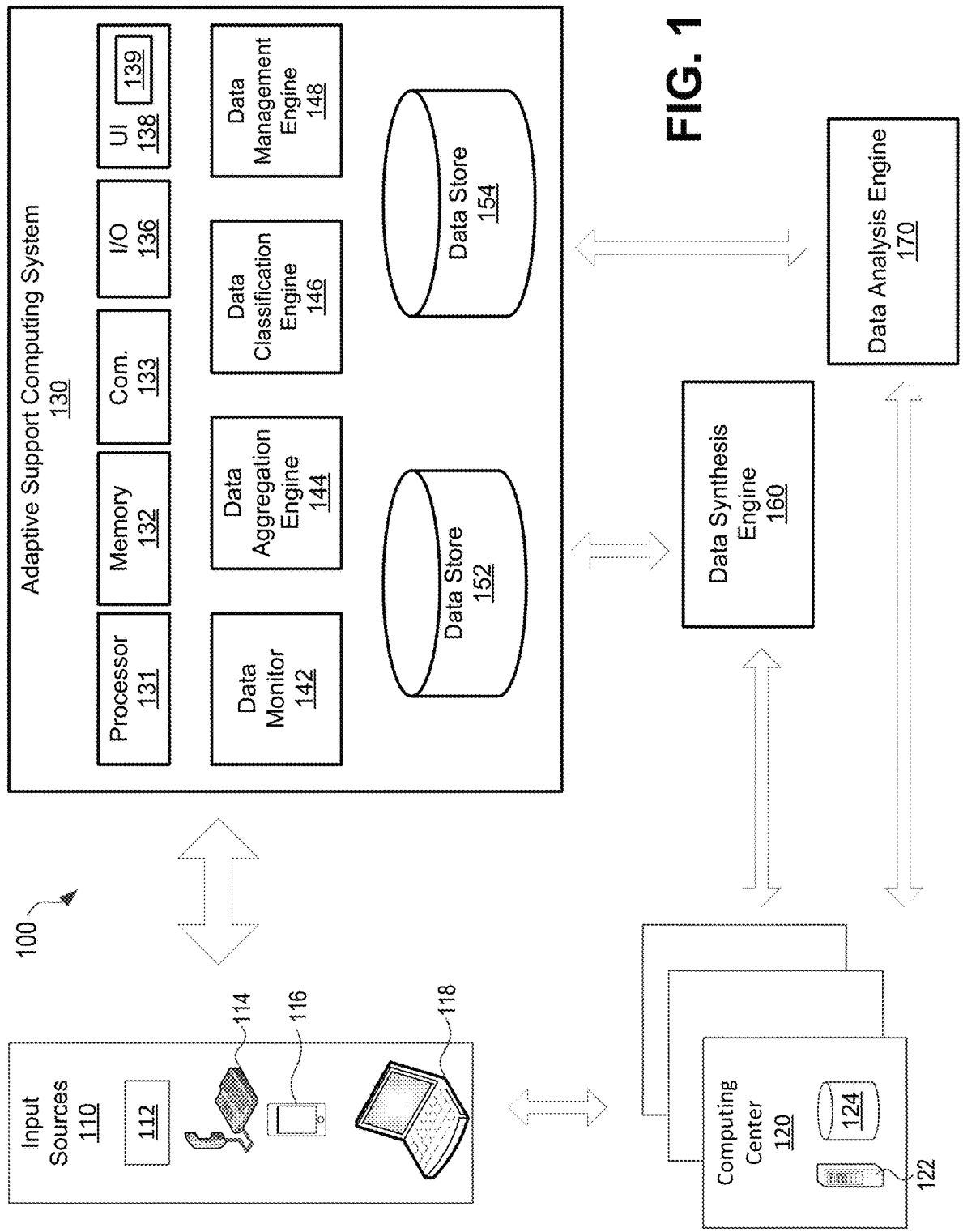
FIG. 1 shows an illustrative adaptive technical support computing system according to one or more aspects of the disclosure.

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In some cases, an inability a business organizations technical support computing system to correlate natural language components of a technical problem report messages, in one or more languages, associated with reported technical issues may cause an increase in cost and/or time necessary to resolve the reported technical issue. The natural language components of a technical problem report message may come in one or more different forms, such as a "trouble ticket" message generated by a dedicated support webpage, a customer feedback message that may comprise an email message, a text message and/or the like, an online chat message thread, a recorded audio message, a system log associated with an underlying application issue, a network monitoring log showing network traffic, a computing resource log showing application processor and/or memory use, and/or the like. To reduce time and/or costs associated with identifying and/or resolving network and/or computing resource problems, a machine learning engine adapted to identify problems associated with computing resources, monitor communications and/or upgrades to computing components (e.g., hardware upgrades, software upgrades, configuration upgrades, and/or the like), predict one or more resolutions of the issue based on a repository of best practices and/or instructions (e.g., a knowledge database) to minimize time and manpower costs while quickly resolving the issue.

Over time, a machine learning engine may process one or more algorithms to learn one or more possible solutions to certain classifications of technical issues (e.g., a server timeout issue may be solved by restarting the server, restarting a service processed by the server, terminating one or more communication channels connected to the server, and the like). The machine learning engine may be capable predict one or more solutions, or combinations of solutions, to different technical issues that may be encountered. The machine learning engine may monitor results of the predicted solutions store the results in a knowledge database entry in the knowledge database, associated with hardware software and/or configuration characteristics of the server experiencing the problem.

The machine learning engine may be configured to use a systematic approach towards culling and/or collating inputs from various data sources including, but not limited to, engagement tools, "trouble ticket" messaging systems, chat conversations, audio recordings of technical support voice conversations (e.g., a telephone conversation, a voice over internet protocol (VOIP) conversation, an email message chain, data center logging tools, system performance tool logs and/or the like. In some cases, an algorithm to gauge the effectiveness and assign scoring based on proven solutions/resolutions may be used by the machine learning engine. Such algorithms may associate a weight and/or other multiplier to one or more steps in a predicted solution process, where the weights and/or multiplier may correspond to a relationship between the computing system associated with a known solution and the computing system experiencing the reported problem. For example, the weights and/or multipliers may be associated with correlations between different computing systems, such as correlations between hardware type and/or version, software type and/or version, configuration settings and/or the like. In an illustrative example, a multiplier of 1 may be assigned to a hardware related solution step when a hardware configuration is nearly identical between the systems. In some cases, a multiplier of 0.9 may be assigned to a software related solution step when different versions of software are identified. Such multipliers are illustrative and, as such, are not limited to those noted in the discussed examples.

In some cases, the machine learning engine may have an ability to gather large amounts of varied technical support knowledge may be able to query and/or extract data entries in an on-demand basis using one or more statistical methods. In some cases, an increasing availability of online collaborative knowledge resources, the machine learning engine (e.g., an expert system) may be designed to dynamically suggest solutions to complex problems by deriving one or more predicted solutions through reasoning instead of conventional procedural code, such as applying a same series of solution steps in all situations. The machine learning engine may use mass spectra of the historical data together with the knowledge base of procedures, troubleshooting techniques, outcomes, system behavior, performance stability, to predict a set of possible conclusive structures.

FIG. 1 shows an illustrative adaptive technical support computing system 100 according to one or more aspects of the disclosure. In an illustrative example, the adaptive technical support computing system 100 may include a one or more input sources 110 for communicating data records corresponding to a technical support issue and may include, but not be limited to, system monitoring tools 112, an audio record entry device 114, a text record entry device 116, a form-based record entry device 118 and/or the like. In some cases, the input sources 110 may be used to communicate data entries associated with technical support issues identified regarding one or more computing systems, such as the one or more computing centers 120 (e.g., a data center, a cloud computing system, and the like). Each of the one or more computing centers may include one or more servers 122 (e.g., a web server, a data server, an application server, and the like) and/or one or more data repositories 124 that may store information associated with the product or service, instructions that when executed provide the product and/or service, data logs, and the like. In some cases, an adaptive support computing system 130 may be specifically programmed to provide a machine-learning-based technical support computing system and may include at least one processor 131, one or more memory devices 132, a communication interface 133, an input/output (I/O) interface, a user interface 138 that may be used to present one or more user interface screens 139 to a user. The adaptive support computing system 130 may be specifically programmed to include one or more of a data monitor 142, a data aggregation engine 144, a data classification engine 146, a data management engine 148, and one or more data repositories such as a data repository 152 storing data structures associated with reported problem data entries, and a data repository 154 storing data structures corresponding to resolutions to reported problems. In some cases, the adaptive support computing system 130 may include, or be communicatively coupled via a network to one or both of a data synthesis engine 160 and a data analysis engine 170.

In some cases, the adaptive support computing system 130 may have a processor 131 for controlling overall operation of the adaptive support computing system 130 and its associated components, including the one or more memory devices 132 (e.g., a non-transitory memory device, a random access memory (RAM) device, a read only memory (ROM), and the like), the I/O interface 136, and the like. The adaptive support computing system 130 may communicate with one or more external devices, such as the input sources 110, the one or more computing centers 120, the data synthesis engine 160 and the data analysis engine 170 via the communication interface 133. In some cases, the data synthesis engine 160 and/or a data analysis engine 170 may be included in a distributed system, where these engines may be incorporated into a computing device separate from the adaptive support computing system 130. In some cases, one or both of the data synthesis engine 160 and a data analysis engine 170 may be incorporated in a portion of the adaptive support computing system 130. Data monitor 142

The I/O interface 136 may include one or more user interfaces, such as a microphone, a keypad, one or more buttons, one or more switches, a touch screen, a stylus, one or more pressure sensors, one or more biometric sensors, and/or one or more other sensors (e.g., a temperature sensor, a humidity sensor, and the like) through which a user of the adaptive support computing system 130 may provide input, and may also include one or more of a speaker for providing audio output and a video display device for providing textual, audiovisual and/or graphical output. Software may be stored within the one or more memory devices 132 and/or storage to provide instructions to the one or more processors 131 for enabling the adaptive support computing system 130 to perform various actions. For example, the one or more memory device 133 may store software used by the adaptive support computing system 130, such as an operating system, application programs, and the associated databases 152 and 154. The various hardware memory units of the one or more memory devices 133 may include volatile and nonvolatile, removable and non-removable media implemented in any method or technology for storage of information such as computer readable instructions, data structures, program modules or other data. The one or more memory devices 133 also may include one or more physical persistent memory devices and/or one or more non-persistent memory devices. The one or more memory devices 133 may include, but is not limited to, RAM, ROM, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the one or more processors 131.

The one or more processors 131 may include a single central processing unit (CPU), which may be a single-core or multi-core processor (e.g., dual-core, quad-core, and the like), or may include multiple CPUs. In some cases, the one or more processors 131 may have various bit sizes (e.g., 16-bit, 32-bit, 64-bit, 96-bit, 128-bit, and the like) and various processor speeds (ranging from 100 MHz to 5 Ghz or faster). The one or more processors 131 and the associated components may allow the adaptive support computing system 130 to execute a series of computer-readable instructions, for example, to receive and/or monitor data entries communicated via a network by the one or more data sources 110 associated with problems being experienced at one or more data centers 120, analyze and classify the received data entries and to aggregate the received data records to form a data entry corresponding to the communicated technical problem and the steps taken in finding a resolution, and storing a data record associated with the technical problem with a link to a linked list associated with the sequence of steps performed to resolve the technical problem.

In some cases, the adaptive support computing system 130 may include the illustrative user interface 138 that may be capable of displaying one or more user interface screens 139 on a display device, either local to or remote from the adaptive support computing system 130. The user interface screens 139 may include screens for displaying information to the user and/or receiving information from the user.

The network connections depicted in FIG. 1 may include a local area network (LAN) and/or a wide area network (WAN), a wireless telecommunications network, a wired communications network and/or may also include other communications networks. When used in a LAN networking environment, the adaptive support computing system 130 may be connected to the communications network through a network interface or adapter such as the communication interface 133. When used in a WAN networking environment, the adaptive support computing system 130 and/or the communication interface 133 may include a modem or other means for establishing communications over the WAN, such as the Internet, a cellular network, and the like. When used in a wireless telecommunications network, the adaptive support computing system 130 may include one or more transceivers, digital signal processors, and additional circuitry and software for communicating with wireless computing devices (e.g., mobile phones, portable customer computing devices) via one or more network devices (e.g., base transceiver stations) in the wireless network.

In some cases, the adaptive support computing system 130 may include a security and integration layer (not shown), through which communications may be sent and managed between the adaptive support computing system 130 and the remote devices and/or computing systems. The security and integration layer may include one or more computing devices, such as web servers, authentication servers, and various networking components (e.g., firewalls, routers, gateways, load balancers, and the like), having some or all of the elements described above with respect to the adaptive support computing system 130. As an example, security and integration layer may comprise a set of web application servers configured to use secure protocols and to insulate the adaptive support computing system 130 (e.g., one or more servers, a workstation, and the like) from external devices, such as the input devices 110 and/or the computing centers 120. In some cases, the security and integration layer may correspond to a set of dedicated hardware and/or software operating at the same physical location and under the control of same entities as the adaptive support computing system 130. For example, the security and integration layer may correspond to one or more dedicated web servers and network hardware in a data center or in a cloud infrastructure supporting a cloud-based application and/or process. In other examples, the security and integration layer may correspond to separate hardware and software components which may be operated at a separate physical location and/or by a separate entity.

In some cases, the data transferred to and from the adaptive support computing system 130 may include secure and sensitive data and/or the devices communicating with the adaptive support computing system 130 may store or otherwise process secure and sensitive data. Therefore, it may be desirable to protect the data transmission by using secure network protocols and encryption, and also to protect the integrity of the data stored when on the adaptive support computing system 130 using the security and integration layer to authenticate users and restrict access to unknown or unauthorized users. In various implementations, the security and integration layer may provide, for example, a file-based integration scheme or a service-based integration scheme. In file-based integration, data files may be transmitted to and from the adaptive support computing system 130 through the security and integration layer, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption.

In service-based integration, one or more web services may be implemented within the adaptive technical support computing system 100 between the adaptive support computing system 130 and/or the security and integration layer. The web services may be accessed by authorized external devices and users to support input, extraction, and manipulation of the data in the adaptive support computing system 130. Web services built to support the adaptive technical support computing system and/or the adaptive support computing system 130 may be cross-domain and/or cross-platform, and may be built for enterprise use. Such web services may be developed in accordance with various web service standards, such as the Web Service Interoperability (WS-I) guidelines. In some examples, system web service may be implemented in the security and integration layer using the Secure Sockets Layer (SSL) or Transport Layer Security (TLS) protocol to provide secure connections between the adaptive support computing system 130 and various clients attempting to access, insert and/or manipulate data within the adaptive technical support computing system 100. SSL or TLS may use HTTP or HTTPS to provide authentication and/or confidentiality. In some cases, system web service may be implemented using the WS-Security standard, which provides for secure SOAP messages using XML encryption. In still other examples, the security and integration layer may include specialized hardware for providing secure web services. For example, secure network appliances in the security and integration layer may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within the one or more memory devices 132 or other components in the adaptive technical support computing system 100, may include one or more caches, for example, CPU caches used by the one or more processors 131, page caches used by the operating system, disk caches of a hard drive, and/or database caches used to cache content from the database 152 and/or the database 154. For embodiments including a CPU cache, the CPU cache may be used by one or more processors in the one or more processors 131 to reduce memory latency and access time. In such examples, the one or more processors 131 may retrieve data from or write data to the CPU cache rather than reading/writing to memory 115, which may improve the speed of these operations. In some examples, a database cache may be created in which certain data from the database 152, 154 may be cached in one or more separate smaller databases on an application server separate from the database server. For instance, in a multi-tiered application, a database cache on an application server can reduce data retrieval and data manipulation time by not needing to communicate over a network with a back-end database server. These types of caches and others may be included in various illustrative examples, and may provide potential advantages in certain implementations of the adaptive technical support computing system 100.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, Bluetooth, WiMAX, etc., is presumed, and the various computer devices and insurance clearinghouse system components described herein may be configured to communicate using any of these network protocols or technologies.

In some cases, the one or more servers 122 and/or data repositories 124 of the data centers 120 may be adapted to provide a particular functionality (e.g., consumer account management, a web-based product sales system, and the like). Such data centers may be distributed in one or more geographic locations to allow for shared computing resources, particularly in applications that required large bandwidth and/or processing power to provide a particular service to a large number of individuals. For example, an illustrative data center may be configured to provide consumer access to an account, such as a financial account held by an individual at a financial institution. In some cases, one or more data centers 120 associated with this functionality may be located in one or more geographic locations. In some cases, the hardware, software and/or configuration may be the same at each location. In some cases, one or more of the hardware, software and or configuration information may be different between two or more of the data centers 120. For example, a first data center may include different hardware (e.g., different age hardware, different driver versions, different vendors of various components, different operating system installed on the servers, different software applications installed on the servers, and/or the like) than was included in a second data center. As such, a problem experienced in a first data center, while similar to a problem experienced at a second data center, may have a different cause and/or resolution.

In some cases, the one or more data centers may be installed using a "cloud computing model" to provide convenient, on-demand network access to a shared pool of configurable computing resources (e.g., networks, servers, storage, applications, and services). The shared pool of configurable computing resources may be rapidly provisioned via virtualization and released with low management effort or service provider interaction, and then scaled accordingly. A cloud computing model can be composed of various characteristics (e.g., on-demand self-service, broad network access, resource pooling, rapid elasticity, measured service, and the like), service models (e.g., Software as a Service ("SaaS"), Platform as a Service ("PaaS"), Infrastructure as a Service ("IaaS"), and deployment models (e.g., private cloud, community cloud, public cloud, hybrid cloud, and the like). An environment that implements the cloud computing model is often referred to as a cloud computing environment. In some cases, such configurability may cause inadvertent problems when implementing a configuration designed based on different hardware and/or software configurations.

The data centers 120 may include a number of computing resources that may collectively provide an enormous amount of computing resources such as processing power, memory, storage, bandwidth, and the like. A data center might be, for example, a sophisticated business location employing large numbers of individuals, and including perhaps hundreds or thousands or racks of servers. Each data center is located within a particular region of the world, and for cloud services that are sensitive to region or latency, tend to support services offered in that particular region. While a data center might be quite large, as the demand for cloud computing increases in that region, the utilization of the data center can also increase to the point where most of the data center is utilized.

In some cases, the data centers 120 may include multiple data centers that are each configured such that requests for services corresponding to a particular region that may be processed and satisfied by any of the data centers within the regional data center system. The data centers need not be the same size, but may be sized in any manner desired by the owner and/or administrator of the regional data center system. For instance, in one embodiment, the region may start with but a single larger data center. Then, as demand grows in that particular region, additional data centers may be added and/or additional computing resources may be added or removed based on age of the equipment, a number of requests processed at each location and the like. In some cases, some data centers may be smaller in computing power than the other larger data centers.

In some cases, the operation of each of the data centers 120 may be monitored using one or more system monitors 112 and/or by processing one or more data logs stored by applications running at each data center. For example, a system monitor 112 may be located external to, or as part of, a particular data center and may be configured to monitor one or more performance characteristics of the devices, such as processing power, communications throughput, system errors, and the like. In some cases, the system monitor 112 may be configured to monitor each data center as a whole and/or each component (e.g., the one or more servers 122, the one or more data repositories 124, and the like) of the data center individually. The system monitor 112 may store one or more criteria to set performance thresholds to gauge performance of the data center. For example, a threshold may be set to specify that no more than a specified level (e.g., about 85%, about 90% and the like) of the processing power of each server 122 of the data centers 120 be used over a specified time period. In some cases, a threshold may be set to specify that no single application is to utilize no more than a specified level (e.g., about 30%, about 50%, and the like) of each server's processing power. Other thresholds may include a maximum message frequency (e.g., messages per time period, and the like), a maximum data repository size, a maximum memory usage and/or the like.

In some cases, when a threshold has been met, an alert may be set to notify one or more components of the adaptive technical support computing system 100 that a technical problem has been identified at a particular data center 120 and/or a particular device 122, 124 of the data center 120. In response to an alert, a message may be generated and sent via a network connection to the adaptive support computing system 130. Such a message may be used to generate a data record associated with an identified problem, where the data record includes a problem description, a time, a geographic location id, a data center id, hardware information (e.g., vendor information, model information, component version information, driver information, and the like), software information (e.g., vendor information, version information, service pack information, a list of installed software, and the like) data center configuration information (e.g., server types installed, number of servers, operating system information for each server, and the like), server configuration information (e.g., driver information, configuration setting information, hardware version information, hardware BIOS information, and the like).

In some cases, one or more messages may be generated regarding an identified problem (e.g., an overload condition, a maximum processing power condition, and the like) such as a problem at a particular data center and may be communicated to the adaptive support computing system 130. In some cases, the data monitor 142 may be configured monitor communications received from the one or more input sources 120 to identify a first indication of a problem at a data center. In response, the data monitor may generate a data record associated with the identified problem and may continue monitoring messages sent from a user of the input device 110 to the adaptive support computing system 130 and from the adaptive support computing system 130 to the user via a specified method, such as an email, a text message, a chat message, via a web interface and the like. In some cases, the messages from the adaptive support computing system 130 may be generated by one of the data synthesis engine 160 and the data analysis engine 170. In some cases, the data monitor 142 may associate a plurality of messages corresponding to the identified problem at the data center in a single data record or as a set of linked data records stored in the data sore 152. In some cases, the data store 152 may correspond to an error data repository storing current and/or historical information corresponding to problems identified at a computing center 120. In some cases, the set of data records may include a series of data records associated with messages identifying a problem, a series of steps performed in identifying and/or applying a solution to the problem, and a record indicating the problem has been resolved. In some cases, the data monitor 142 may be configured to analyze a number of historical records to identify historical problems at computing centers and/or solutions to those problem. The historical records may include emails, audio records (e.g., a voice recording of a conversation on a technical help line, text messages, chat messages, and the like). In some cases, the data monitor may identify a plurality of messages, from one or more different sources, to identify a problem and a series of steps performed in finding a resolution, and then generating a data record including the problem information and the solution information. In some cases, the data monitor may monitor email communications to identify a first message in a message chain and a last message in a message chain, where the plurality of messages in the message chain may be included in successive emails (e.g., a series of email sent in response to a prior email, and the like).

In some cases, the data monitor 142 may comprise a single application configured to monitor a plurality of input sources. In some cases, the data monitor 142 may comprise a plurality of data monitor application, each of which may be configured to monitor a particular input source, such as an email data monitor, an audio message data monitor, a chat message data monitor, a text message data monitor, a web interface data monitor and/or the like. The data aggregation engine 144 may be configured to process instructions to aggregate communications received from the one or more data sources 110 and identify which of the messages are associated with a same problem. For example, when a problem is identified at a computing center 120, one or more messages may be communicated to the adaptive support computing system 130 via one or more input sources 110 by one or more users. In some cases, the problems may be identified differently, based on a particular functionality being utilized by the user. The data aggregation engine 144 may be configured to analyze each data record generated by the data monitor to identify common attributes (e.g., time, location, server, application, and the like) of the different records. When a common link has been found, the data aggregation engine 144 may generate a link between the data records to form a complete message chain including messages from one or more different input sources and/or from one or more different users or system monitor applications. Data monitoring and/or aggregation performed by the data monitor 142 and/or the data aggregation engine 144 may be a continuous process (e.g., at near real time) and/or may be performed at specified intervals (e.g., each minute, each hour, daily, weekly, and the like).

Once the data records have been generated and aggregated, the data classification engine 146 may analyze each data record to assign a classification to the identified problem. For example, the data classification engine may analyze a plurality of data records to identify a problem as a hardware problem, a software problem a configuration problem and/or the like. In some cases, the data classification engine may assign a classification to an initial record received regarding a problem, based on the information received from the input source 110. In some cases, the classification may be associated with the data record as an initial classification attribute. In some cases, based on a resolution and/or the steps performed in resolving the problem, the classification may change. For example, a system load problem may be identified by the data classification engine based on the information received from the input source in the initial message as a network loading problem. However, based on the steps performed and/or one or more different identified problems identified at near the same time, the data classification engine may identify a different classification, such as a hardware failure. In doing so, the data classification engine may associate a second classification attribute (e.g., a resolution classification) to a same data record. In doing so, a robust knowledge base can be developed and stored in the knowledge base data store 154, where each data record may include a plurality of data records of problems encountered and/or resolved at the different computing centers 120.

In some cases, the data monitor 142 may augment the knowledge base by monitoring information regarding upgrades and/or new versions of hardware, software, firmware that may be installed and used the different computing centers. For example, the data monitor may identify hardware vendors and/or versions installed at each of the plurality of the computing centers 120 and periodically (e.g., every month, every six months, yearly, and the like) to identify bug fixes, patches, new functionality added to the hardware, firmware and/or software of the devices at the computing centers 120. This information may be communicated to the data aggregation engine 144 to for inclusion in the appropriate data records. In some cases, the data aggregation engine may generate a plurality of data records, each associated with a different version of hardware, software and/or firmware in use at the computing center and/or that has been released by the particular vendor. Such information may be stored in the knowledge base data store to further augment the number of known solutions to possible problems that may be encountered at each computing center 120.

The data management engine may be used to manage the knowledge base data store 154 and/or maintain the links to records stored in the historical message data store 152. For example, the data management engine 148 may be configured to manage records in one or both the historical data record data store 152 and/or the knowledge base data store 154. In some cases, the data management engine may be configured to process one or more machine learning algorithms to analyze the information in each data repository to identify data patters based on identified criteria, such as problems encountered with particular hardware, particular software, particular configurations of hardware and software, and the like. The data management engine 148 may act as a management engine for a central repository for identifying, replicating and/or simulating an occurrence to be able to predict a most probable solution. In some cases, the data management engine 148 may process one or more models of a data server, such as in a virtual machine environment, to simulate the operation of particular configuration of computing hardware, software, and/or firmware, along with particular application and functionality operating on those particular configurations, that are installed at different computing centers. This simulation information may be used to predict possible problems that may be encountered at different computing centers. In analyzing the problems, the data management engine may generate records to identify similarities between different configurations to identify one or more different errors, or symptoms of errors, that may be resolved using particular sequences of steps.

In some cases, the data management engine 144 may work in combination with one or both of the data synthesis engine 160 and/or the data analysis engine to address issues of known problems, and or simulated problems, to build via an inductive reasoning module to leverage known information to predict number of likely solutions to each possible problem. Inductive reasoning, as performed by may be used to supply strong evidence for each possible solution predicted by the data management engine, data synthesis engine 160 and/or the data analysis engine 170 based on the evidence received by the data monitor 142 and/or the data aggregation engine 144.

In some cases, in a particular environment, previous methods may result in a set of alerts may include a specified number of alerts (e.g., about thirty alerts, about forty alerts, and the like), where several different resolutions options appear to be simplistic and may ignore an occurrence pattern and/or dependencies. Predictability may revolve around known methods and/or changes and may rely upon known simplistic resolutions. In many cases, the dependencies and differences in system architecture at the different computing centers 120 may result in interdependencies that are more complex than is initially recognized, resulting in problems that are more complex in nature and may be dependent upon previously unknown attributes and/or parameters. In using the adaptive support computing system 130, the machine learning model may be used to analyze the data records to determine differences between problems that may initially appear to be substantially similar. Once the problem differences have been identified, the data management engine may analyze steps performed in the solution to identify differences, thus building a richer data record. In simulation of the identified problems, the differences may be analyzed to determine which solution may be better suited to a particular computing center configuration. Here, the adaptive support computing system 130 may include the ability to gather large amounts of varied support information and query and extract information on an on-demand basis using powerful statistical methods. Increasing availability of online collaborative knowledge resources, such as the knowledge data store 154, allow the adaptive support computing system 130 to dynamically suggest solutions to complex problems by deriving at a most likely solution through machine learning base reasoning instead of applying traditional procedural code. The adaptive support computing system 130 may use the historical data stored in the historical data store 152, along with the knowledge base of procedures, troubleshooting techniques, outcomes, system behavior, performance stability and the like that may be stored in the knowledge base data repository to generate a series of most likely resolutions to a problem.

In some cases, the data synthesis engine 160 and the data analysis engine 170 may be configured to receive alerts regarding the performance of one or more of the computing centers 120. For example, an alert may be generated automatically by the data center 120 when certain criteria (e.g., a system load threshold, a processor load threshold, a message throughput threshold, and the like) has been met. In such cases, a performance alert may be generated and communicated via a network to one or both of the data synthesis engine and/or the data analysis engine 170. In some cases, the data synthesis engine may identify a problem based on the received information associated with the alert (e.g., configuration information, performance information, application information, and the like) to predict a most likely solution. For example, the data synthesis engine 160 may predict a particular solution, as defined in the knowledge base data store 154, as a most likely solution. The data synthesis engine 160 may then communication the predicted solution (e.g., steps 1, 2, and 3) to be performed at the data store. In some cases, the data synthesis engine may initiate each step automatically on the identified equipment at the computing center 120. The results of each of the solution steps may be monitored by the data synthesis engine 160 and/or the data monitor 142 to determine whether the solution has been successful. Upon completion of the predicted solution, the success or failure of the solution may be included in the knowledge base, along with a record of the identified problem. In doing so, the adaptive learning engine of the data management engine 148 may adapt the probabilities associated with this particular solution based on the success or failure of each of the steps included in the solution.

In some cases, the data analysis engine 170 may work in conjunction with a smart client that may be included in the data analysis engine or located remotely, such as at a location of the computing center 120. In some cases, when an alert is received by the data analysis engine 170, the data analysis engine may analyze the information received with the alert to identify one or more possible problems. The data analysis engine 170 may then predict, based on information stored in the knowledge base data store 154 and/or the historical record data store 152, to predict a plurality of possible solutions to the identified problem(s). In some cases, the data analysis engine 170 may rank the plurality of solutions based on a historical success and/or failure rate associated with each of the solutions.

For example, an identified problem (e.g., a system load issue) may have three possible solutions identified by the data analysis engine 170, where the first solution includes steps 1, 3, and 5 from the knowledge base, the second solution includes steps 2, 3, and 4, and the third solution includes steps 1, 4, and 5. Based on an analysis of the data center information and the historical success and/or failures of each solution, the data analysis engine 170 may assign a probability of 80% success to the first solution, a probability of 82% success to the second solution, and a probability of 79% to the third solution. Based on this, the data analysis engine 170 may communicate the steps of the second solution to a smart client associated the data center 120 experiencing the reported problem. The smart client may apply the second solution to the data center equipment and analyze to the functionality to determine whether the problem has been resolved. The smart client may then report the success and/or failure of the executed solution to the data analysis engine 170 for inclusion in the knowledge base to adjust the probabilities associated with each solution. For example, if a particular solution was successful the probability score may increase for similar configurations and if the particular solution was not successful, the probability score may decrease. If a particular solution was unsuccessful in resolving the identified problem, the smart client may apply the next highest ranked solution (e.g., solution 1) and report the success and/or failure of the results. In doing so, the knowledge base is adapted based on actual results and further comparisons may be made between similar computing center configurations.

Figure 2:
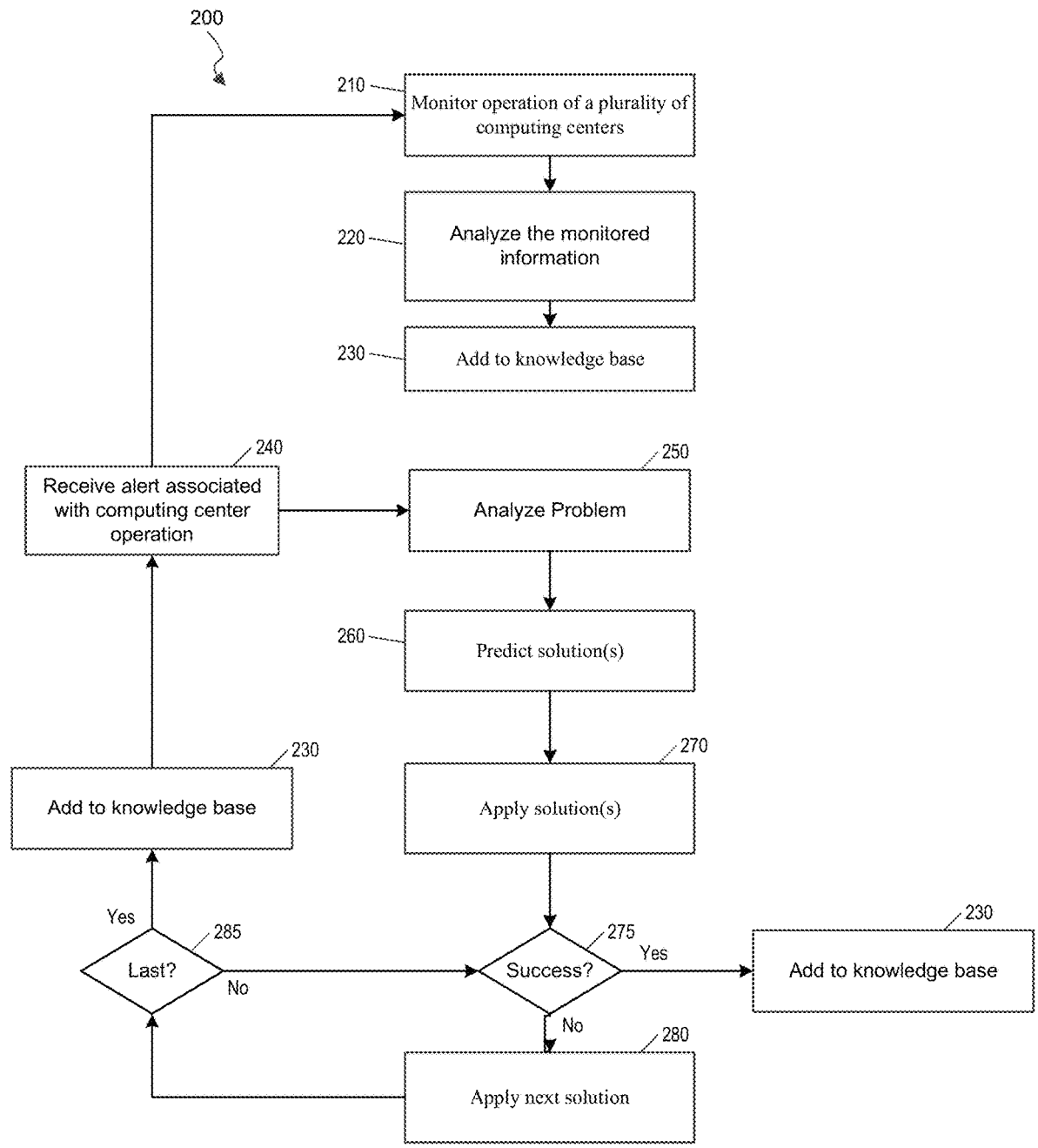
FIG. 2 shows an illustrative flow diagram showing a method of managing a machine learning-based technical support computing system according to one or more aspects of the disclosure.

FIG. 2 shows an illustrative flow diagram showing a method of managing a machine learning-based technical support computing system according to one or more aspects of the disclosure. At 210, the data monitor 142 may monitor operation of a plurality of computing centers such as to identify an operation error at a computing center. In some cases, the data monitor may include operation data corresponding to desired operation of the computing center 120. In some cases, the data monitor may monitor a plurality of input sources that may be associated with one or more error identification and/or reporting systems, and may include one or more of a system monitor 112, the audio message system 114, a text-based message system 116, the web-based messaging system 118 and/or the like. At 220, the data analyzer 144 may analyze the information received by the data monitor 142 to aggregate information associated with a same computing center that may have been received from a plurality of difference input sources 110. In some case, the data aggregation engine may acquire information (e.g., release notes) associated with a hardware version, a firmware version, a software version, an application version and/or the like. At 230, the data classification engine 146 and the data management engine 148 may assign a classification to messages received associated with a problem, and populate a knowledge base data repository 154 with records associated with computing center operation.

At 240, an alert may be received that may be associated with undesired operation of the computing center 120. For example, the alert may be associated with an operational error, such as a system load meeting or exceeding a specified threshold, or other such alert. The alert may be received at the data monitor 120 at 210, as well as one or more of the data synthesis engine 160 and/or the data analysis engine 170 for analysis at 250. At 250, the data synthesis engine 160 and/or the data analysis engine 170 may analyze the received alert to identify a problem and, based on information stored in the knowledge data store 154, predict one or more possible solutions at 260. The solutions may be ranked based on a predicted probability of success. At 270, the highest ranked one of the one or more possible solutions may be applied by the data synthesis engine 160 and/or the data analysis engine 170, such as by providing instructions to be acted upon at the data center 120 and/or to a smart client application associated with the data center 120. At 275, the success or failure of the solution may be determined by the data synthesis engine 160 and/or the data analysis engine 170. Upon success of the solution, the information may be added to the knowledge base data store 154, at 230. If the solution failed at 275, then the next highest ranked solution may be applied by the smart client. At 280. If, at 285, the last solution has not been reached, the success or failure may be evaluated at 275. If the last solution was performed, add the result to the knowledge base at 230 and wait for the next alert at 240.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
a first data repository storing a plurality of historic data records corresponding to operations of a plurality of computing center devices, wherein at least a portion of the historic data records comprise a message chain corresponding to an operational problem of at least one of the plurality of computing center devices;
a second data repository storing a plurality of solution data records, the solution data records comprising at least an identification of a problem experienced by one of the computing center devices and information corresponding to a solution to the problem;
a server including:
a processor; and
a non-transitory memory device storing instructions that, when executed by the processor, cause the server to:
receive, via a communication interface, a computing device error message comprising an error condition currently occurring at one of the plurality of computing center devices, wherein the message includes at least hardware information, software information and configuration information;
identify, based on an automatic machine learning analysis of the plurality of historic data records and the computing device error message, a first associated error condition category that is associated with the error condition currently occurring at one of the plurality of computing center devices, the error condition corresponding to a threshold used to gauge performance of a datacenter comprising the plurality of computing center devices;
identify, based on the plurality of solution data records and at least two of the hardware information, software information and configuration information, at least two solutions to the error condition currently occurring at one of the plurality of computing center devices;
predict, based on an automatic machine learning analysis of the computing device error message, a simulation of a computing center device in a virtual machine environment, the plurality of solution data records, and historical success rates of each of the at least two solutions, a probability of success for each of the at least two solutions to the error condition, wherein the probability of success corresponds to a relationship between a first computing system associated with a known solution and a second computing system experiencing the error condition currently occurring at one of the plurality of computing center devices;
initiate, automatically on equipment at one of the plurality of computing center devices based on a comparison of the probability of success for each of the at least two solutions, a first solution of the at least two solutions that has a greatest probability of success, wherein the solution includes an automatic update to at least one of a hardware configuration or a software configuration of the computing center device currently experiencing the error condition;

initiate, automatically on equipment at the one of the plurality of computing center devices based on the comparison of the probability of success for each of the at least two solutions and based on an unsuccessful resolution to the error condition by a previously initiated solution, a next highest rated solution of the at least two solutions;
identify, based on a confirmed solution to the error condition at the computing center device and one or more identified error conditions, a second error condition category for the computing device error message;
identify, based on a confirmed unsuccessful resolution to the error condition after attempting each of the at least two solutions, a third error condition category for the computing device error message; and
update the second data repository with the first associated error condition category and the second error condition category or the third error condition category for the computing device error message, wherein the plurality of solution data records comprises at least the first associated error condition category and the second error condition category.

2. The system of claim 1, wherein the instructions, when executed by the processor, further cause the server to:
receive an automatically generated response message from a data center computing device, wherein the automatically generated response message is automatically generated by the data center computing device and includes an indication of whether the at least one solution has corrected the error condition.

3. The system of claim 2, wherein the instructions, when executed by the processor, further cause the server to:
store the indication of whether the at least one solution has corrected the error condition in the second data repository; and
store the computing device error message in the first data repository and associate the error condition with the hardware information, software information and configuration information of the computing center device.

4. The system of claim 1, wherein the instructions, when executed by the processor, further cause the server to:
rank each of the at least two solutions to the error condition at the computing center device based on a corresponding probability of success; and
based on an automatically generated response message from a data center computing device, store an indication of success or an indication of failure of at least one of the at least two solutions to the error condition at the computing center device.

5. The system of claim 1, further comprising a data center computing device, wherein the data center computing device processes instructions to provide one or more computing functions to a plurality of users.

6. The system of claim 1, wherein the error condition corresponds to a processor load exceeding a specified threshold.

7. The system of claim 1, wherein the error condition corresponds to a memory usage exceeding a specified threshold.

8. An apparatus comprising:
a processor; and
a non-transitory memory device storing instructions that, when executed by the processor, cause the apparatus to:

receive, via a communication interface, a computing device error message comprising an error condition currently occurring at one of a plurality of computing center devices, wherein the message includes at least hardware information, software information and configuration information;

identify, based on an automatic machine learning analysis of a plurality of historic data records and the computing device error message to identify a first associated error condition category that is associated with the error condition currently occurring at one of the plurality of computing center devices;

identify, based on a plurality of solution data records stored in a knowledge base data repository, at least two solutions to the error condition currently occurring at one of the plurality of computing center devices, the error condition corresponding to a threshold used to gauge performance of a datacenter comprising the plurality of computing center devices;

predict, based on an automatic machine learning analysis of the computing device error message including a simulation of a computing center device in a virtual machine environment and historical success rates of each of the at least two solutions, a probability of success for each of the at least two solutions to the error condition based at least in part of the hardware information, software information and configuration information;

initiate, automatically on equipment at one of the plurality of computing center devices based on a comparison of the probability of success for each of the at least two solutions, a first solution of the at least two solutions that has a greatest probability of success, wherein the solution includes an automatic update to at least one of a hardware configuration or a software configuration of the computing center device currently experiencing the error condition;

initiate, automatically on equipment at the one of the plurality of computing center devices based on the comparison of the probability of success for each of the at least two solutions and based on an unsuccessful resolution to the error condition by a previously initiated solution, a next highest rated solution of the at least two solutions;

identify, based on a confirmed solution to the error condition at the computing center device and one or more identified error conditions, a second error condition category for the computing device error message;

identify, based on a confirmed unsuccessful resolution to the error condition after attempting each of the at least two solutions, a third error condition category for the computing device error message; and update the knowledge base data repository with the first associated error condition category and the second error condition category or the third error condition category for the computing device error message, wherein the plurality of solution data records comprises at least the first associated error condition category and the second error condition category.

9. The apparatus of claim 8, wherein the error condition corresponds to a memory usage exceeding a specified threshold.

10. The apparatus of claim 8, wherein the error condition corresponds to a processor load exceeding a specified threshold.

11. The apparatus of claim 8, wherein a data center computing device processes instructions to provide one or more computing functions to a plurality of users.

12. The apparatus of claim 8, wherein the instructions, when executed by the processor, further cause the apparatus to:

rank each of the at least two solutions to the error condition at the computing center device based on a corresponding probability of success; and based on an automatically generated response message from a data center computing device, store an indication of success or an indication of failure of at least one of the at least two solutions to the error condition at the computing center device.

13. The apparatus of claim 8, wherein the instructions, when executed by the processor, further cause the apparatus to:

receive an automatically generated response message from a data center computing device, wherein the automatically generated response message is automatically generated by the data center computing device and includes an indication of whether the at least one solution has corrected the error condition.

14. The apparatus of claim 13, wherein the instructions, when executed by the processor, further cause the apparatus to:

store the computing device error message in a first data repository and associate the error condition with the hardware information, software information and configuration information of the computing center device; and store the indication of whether at least one solution has corrected the error condition in a second data repository.

15. A method comprising:

receiving, via a communication interface, a computing device error message comprising an error condition currently occurring at one of a plurality of computing center devices, wherein the message includes at least hardware information, software information and configuration information;

identifying, based on an automatic machine learning analysis of a plurality of historic data records and the computing device error message to identify a first associated error condition category that is associated with the error condition currently occurring at one of the plurality of computing center devices;

identifying, based on a plurality of solution data records stored in a knowledge base data repository, at least two solutions to the error condition currently occurring at one of the plurality of computing center devices;

predicting, based on an automatic machine learning analysis of the computing device error message, a simulation of a computing center device in a virtual machine environment, and historical success rates of each of the at least two solutions, a probability of success for each of the at least two solutions to the error condition based at least in part of the hardware information, software information and configuration information;

initiating, automatically on equipment at one of the plurality of computing center devices based on a comparison of the probability of success for each of the at least two solutions, at least one solution having a greatest probability of success, wherein the solution includes an update to at least one of a hardware configuration or a software configuration of a computing center device currently experiencing the error condition;

initiating, automatically on equipment at the one of the plurality of computing center devices based on the comparison of the probability of success for each of the at least two solutions and based on an unsuccessful resolution to the error condition by a previously initiated solution, a next highest rated solution of the at least two solutions;

identifying, based on a confirmed solution to the error condition at the computing center device and one or more identified error conditions, a second error condition category for the computing device error message;

identifying, based on a confirmed unsuccessful resolution to the error condition after attempting each of the at least two solutions, a third error condition category for the computing device error message; and updating the knowledge base data repository with the first associated error condition category and the second error condition category or the third error condition category for the computing device error message, wherein the plurality of solution data records comprises at least the first associated error condition category and the second error condition category.

16. The method of claim 15, comprising:
ranking each of the at least two solutions to the error condition at the computing center device based on a corresponding probability of success; and
based on an automatically generated response message from a data center computing device, storing an indication of success or an indication of failure of at least one of the at least two solutions to the error condition at the computing center device.

17. The method of claim 15, comprising:
storing the computing device error message in a first data repository and associate the error condition with the hardware information, software information and configuration information of the computing center device.

18. The method of claim 15, comprising:
identifying that the error condition corresponds to a processor load exceeding a specified threshold.

19. The method of claim 15, comprising:
identifying that the error condition corresponds to a memory usage exceeding a specified threshold.

20. The method of claim 15, wherein a data center computing device processes instructions to provide one or more computing functions to a plurality of users and wherein the computing device error message was initiated by at least one user of the plurality of users.

* * * * *